United States Patent [19]

Smith et al.

[11] Patent Number: 5,704,430
[45] Date of Patent: Jan. 6, 1998

[54] GROUND DRIVEN ROW CLEANING APPARATUS

[76] Inventors: David R. Smith, 21761 Rd. 21, Fort Jennings, Ohio 45844; William C. Maenle, 387—4th St., Ottoville, Ohio 45876

[21] Appl. No.: 433,574

[22] Filed: May 3, 1995

[51] Int. Cl.$^6$ ............................................ A01C 5/04
[52] U.S. Cl. ............................ 172/29; 172/184; 172/540; 172/556; 172/624.5; 111/140; 111/924
[58] Field of Search ............................ 172/29, 31, 184, 172/556, 540, 624.5, 662, 683, 661; 111/139, 140, 924, 168, 164, 163, 121

[56] References Cited

U.S. PATENT DOCUMENTS

| | | | |
|---|---|---|---|
| 48,312 | 6/1865 | Ryder | 172/31 |
| 325,512 | 9/1885 | Elam | |
| 1,249,008 | 12/1917 | Bonds, Jr. | |
| 2,706,880 | 4/1955 | Steverwald | 172/662 X |
| 2,790,367 | 4/1957 | Simmons | |
| 4,055,126 | 10/1977 | Brown et al. | 111/140 X |
| 4,187,916 | 2/1980 | Harden et al. | 111/140 X |
| 4,228,861 | 10/1980 | Hart | 172/662 |
| 4,425,973 | 1/1984 | Williams et al. | 111/139 X |
| 4,506,609 | 3/1985 | Fuss et al. | |
| 4,550,122 | 10/1985 | David et al. | 111/140 X |
| 4,574,715 | 3/1986 | Dietrich, Sr. et al. | |
| 4,656,957 | 4/1987 | Williamson et al. | |
| 4,721,168 | 1/1988 | Kinzenbaw | 172/625 X |
| 4,726,303 | 2/1988 | Degelman et al. | |
| 4,738,317 | 4/1988 | Bedney | 172/624.5 |
| 4,785,890 | 11/1988 | Martin | 172/29 |
| 5,152,349 | 10/1992 | Roden | 111/139 X |
| 5,255,617 | 10/1993 | Williams et al. | |
| 5,279,236 | 1/1994 | Truax | 111/139 |
| 5,341,754 | 8/1994 | Winterton | 111/139 |
| 5,349,911 | 9/1994 | Holst et al. | |
| 5,370,070 | 12/1994 | Embree et al. | 111/139 |
| 5,461,995 | 10/1995 | Winterton | 111/139 |
| 5,497,716 | 3/1996 | Shoup | 111/140 |
| 5,515,929 | 5/1996 | Schwitters | 172/662 X |

FOREIGN PATENT DOCUMENTS

| | | | |
|---|---|---|---|
| 1074306 | 1/1960 | Germany | 172/29 |
| 3435192 | 4/1986 | Germany | 111/139 |

Primary Examiner—Terry Lee Melius
Assistant Examiner—Christopher J. Novosad
Attorney, Agent, or Firm—Henderson & Sturm

[57] ABSTRACT

An improved row cleaning apparatus to selectively clean away residue from conservation tilled fields without cultivation of the soil. When mounted on tractor-drawn implements, including planters, the cleaning action of the present invention improves depth control and planting speed of the planter unit while retaining the residue between crop rows for erosion control and yield enhancement. The row cleaner comprises a pair of toothed wheels rotatably operating in lateral opposition to one another and journalled for rotation each on an axis disposed obliquely to the path of travel of the apparatus. The wheels are mounted asymmetrically relative to each other, the teeth being curved downwardly and forwardly toward the path of movement to drive the wheels in rotation, thereby untangling and selectively clearing residue and other mulch from the path of the trailing planter unit. The wheels are mounted for pivotal, vertical movement independent of the implement or planter while maintaining constant the oblique relationship, the movement permitted by a parallel linkage unit having alternate locked and unlocked positions relative to movement, and having variably limited movement in the unlocked position. An alternative embodiment discloses a single-toothed wheel on either a right or left side of the apparatus fulfilling all other structural provisions of each of the pair of toothed wheels.

5 Claims, 6 Drawing Sheets

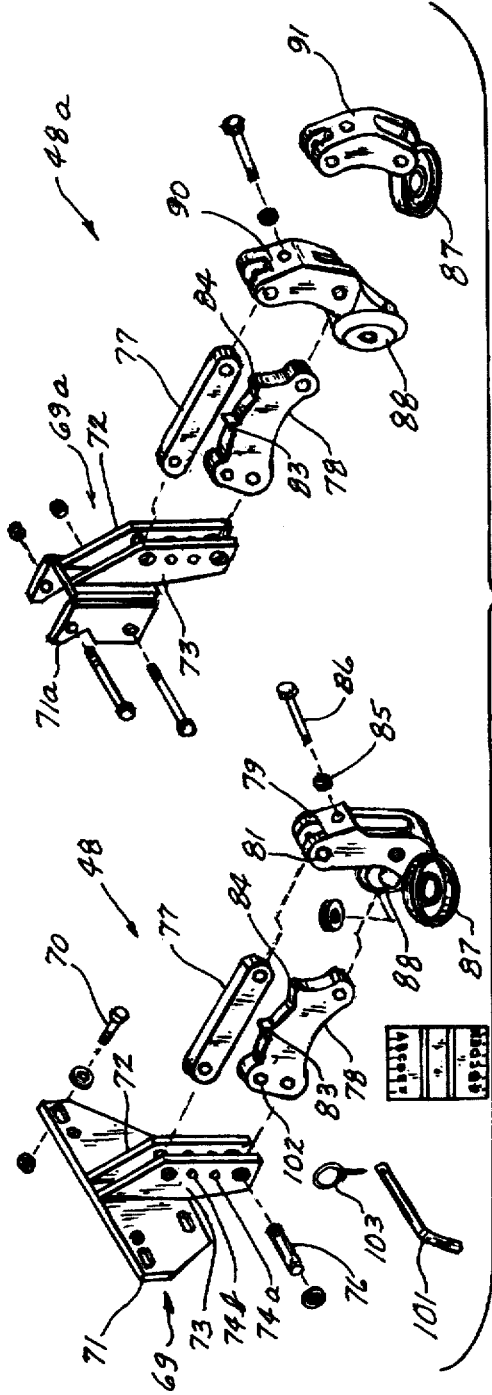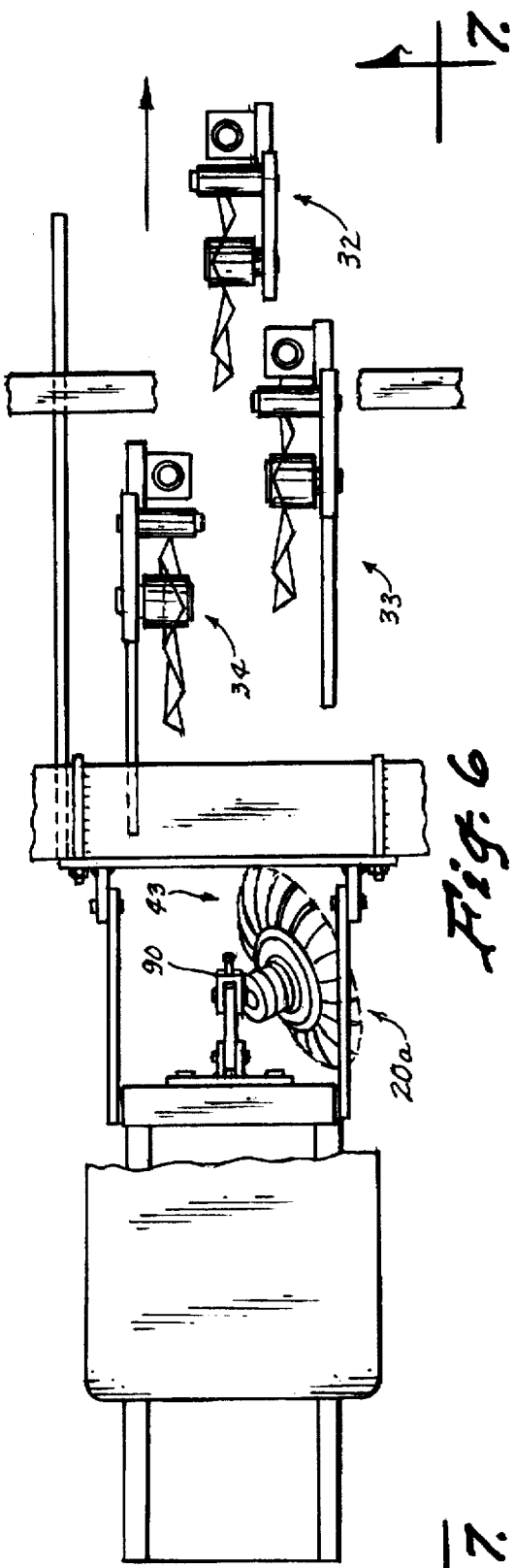

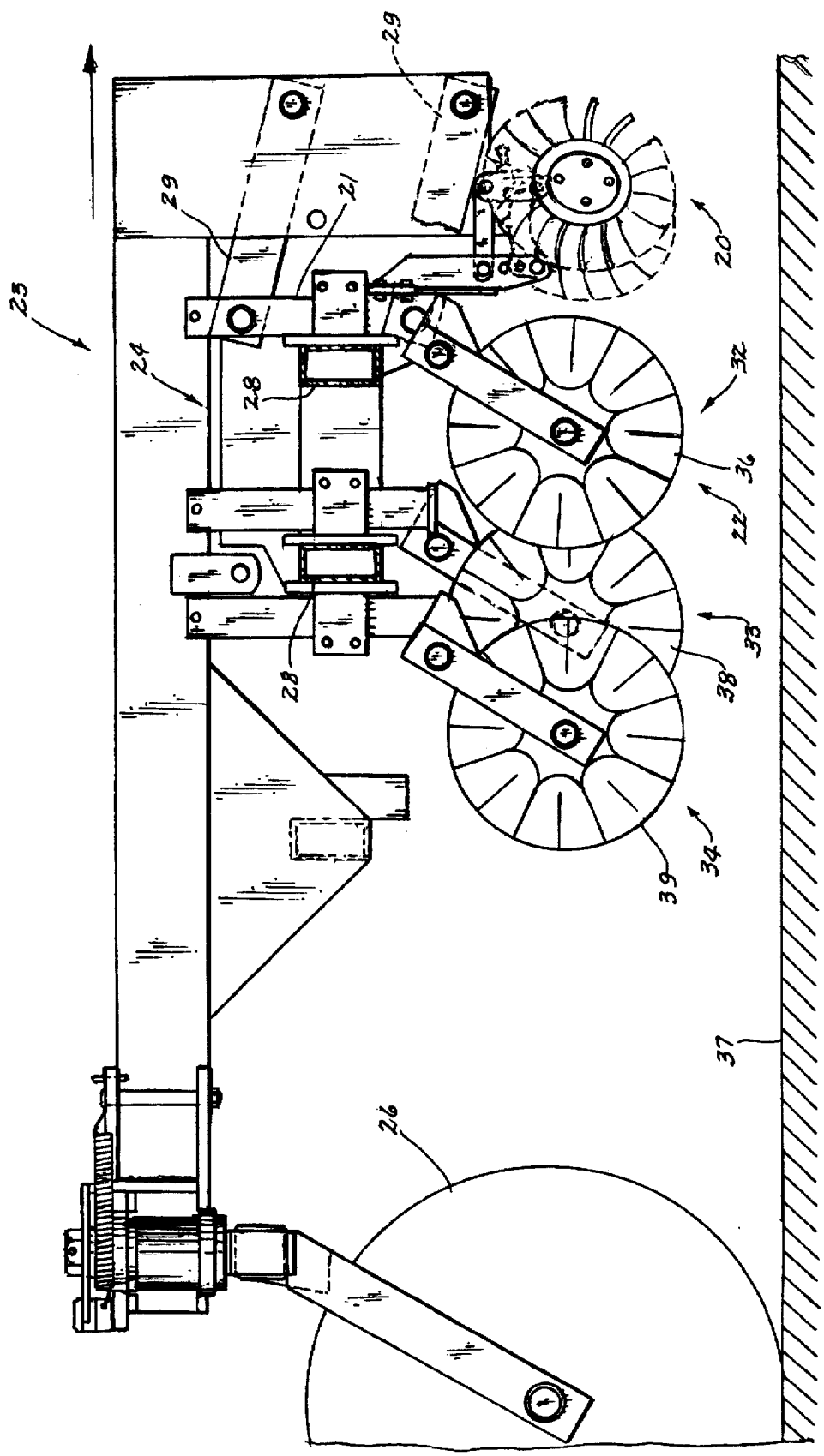

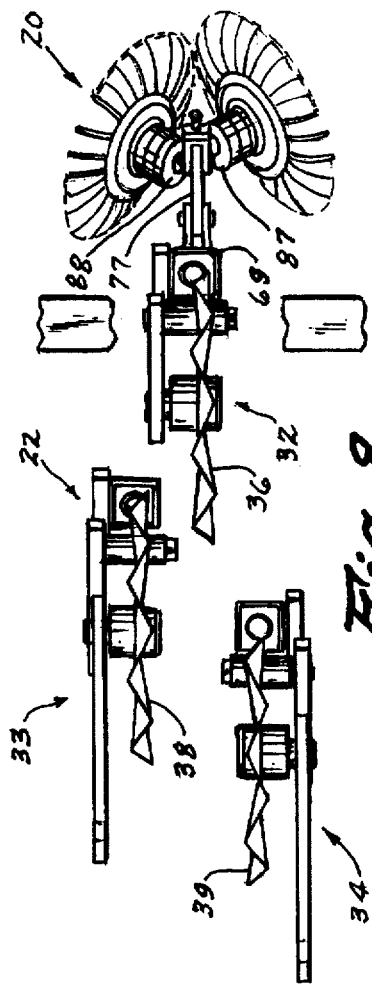
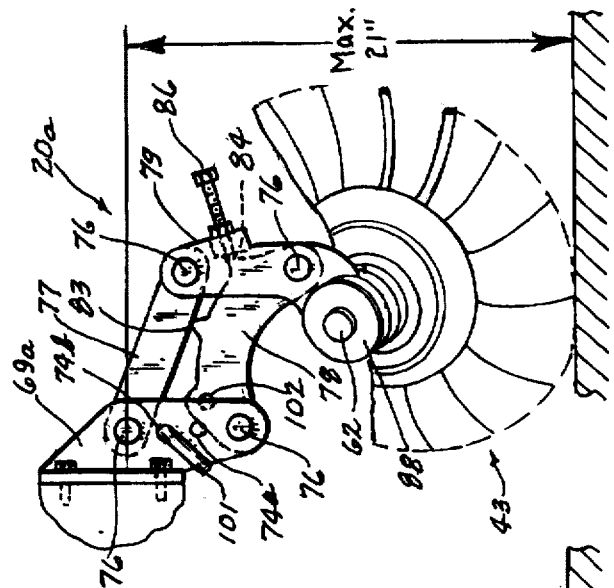
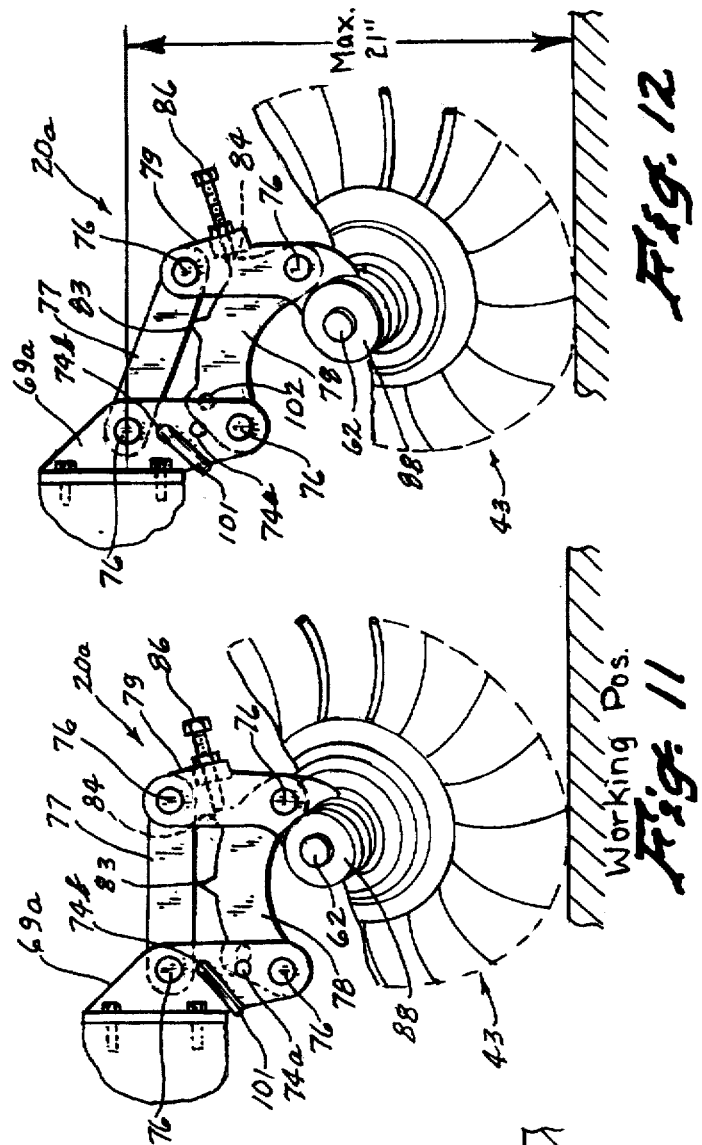
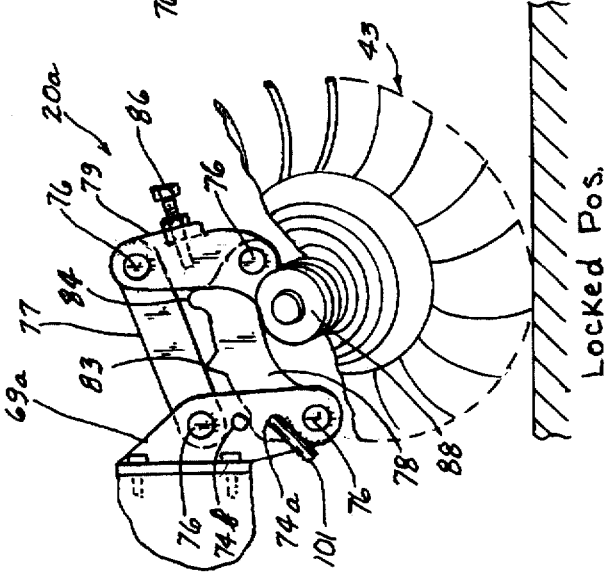

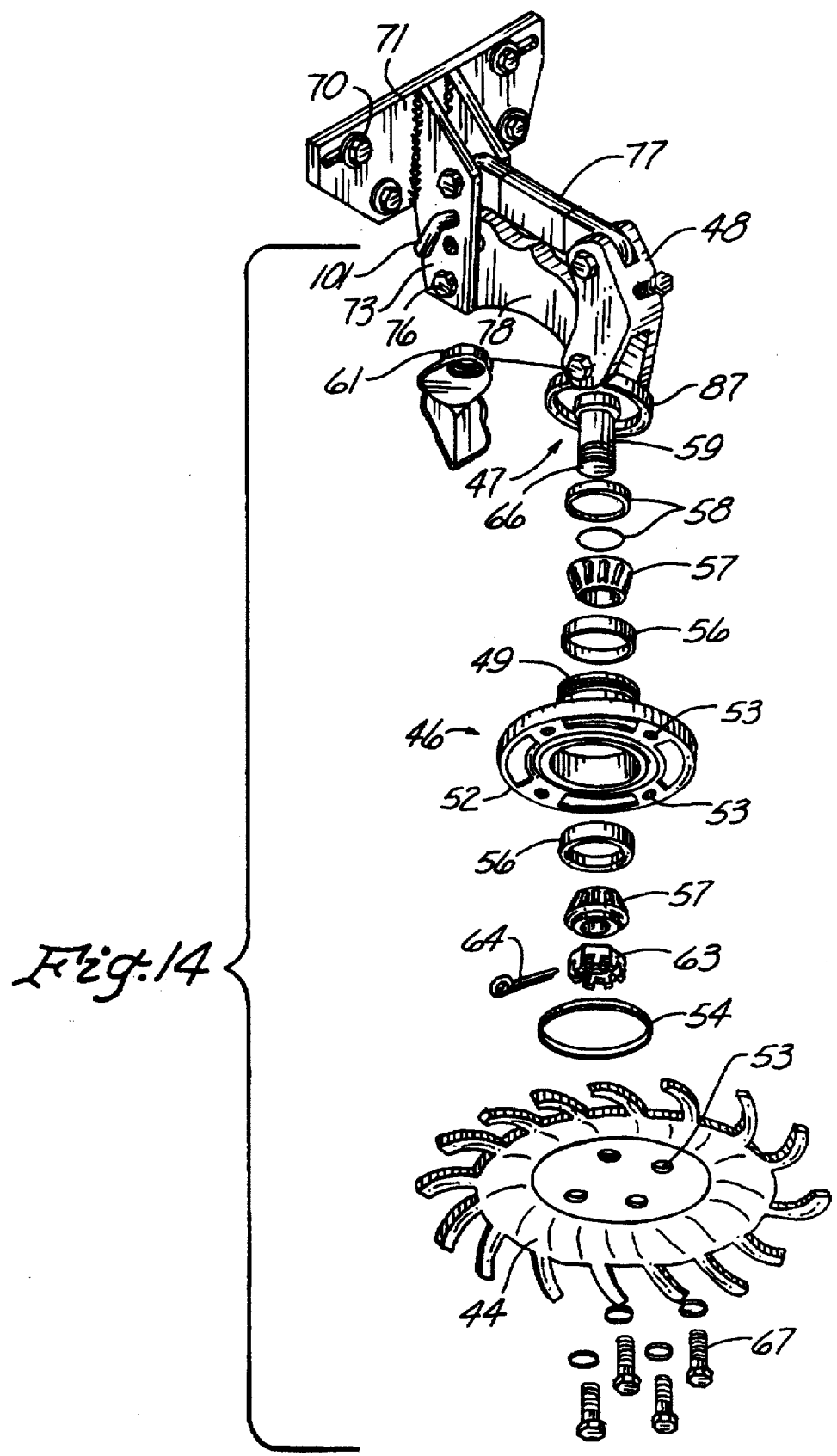

GROUND DRIVEN ROW CLEANING APPARATUS

TECHNICAL FIELD

The present invention relates generally to tillage equipment and, more particularly, to a toothed wheel apparatus mounted either in front of or trailing a plurality of coulters for mixing, tilling and warming up the soil where the seed is to be placed for planting. The toothed wheel apparatus is ground driven and sweeps residue from a path in front of a planter unit so that the planter unit has a clean, residue free strip of soil in which to make the seed bed.

Numerous methods and apparatus are involved in an ever expanding field, if not science of tillage, in the preparation of the soil for seed planting purposes. Today, farmers use and experiment with ridge-tilling, no-tilling, and now are beginning to work with conservation tillage farm equipment and methods. It is the latter to which this invention is directed.

Historically, farmers have relied upon conventional or "deep" tilling to prepare their fields for planting; utilizing a moldboard plow, chisel plow or other cultivating implement which is dragged over the fields after harvest of a prior crop to break up the soil to a substantial depth, to cut and bury the residue of the harvest, and to bring deep soil up to the surface. Several passes of additional implements are required over the same soil prior to planting to facilitate same. Recently, the concept of conservation tillage has emerged utilizing the planter as a primary implement to support blade assemblies used to open a furrow of predetermined depth, to deposit seeds within the furrow, and then to close the furrow over the seeds, all in a single or one-pass.

Conservation or no-till planting appeared to reduce the number of tillage trips over the same field; however, the problem of dealing with the residual mulch has been left somewhat unsolved. Residual mulch is that residue of live and dead vegetation and plant stubble left in place by this type planting after harvest. There are benefits such as aiding in the control of erosion and of fertilization through decomposition along with disadvantages such as retarding evaporation to leave soil at unacceptably high levels of moisture content. Additional problems of fertilizer application and timing relative to the seedbed preparation increased the considerations of management as to the more contemporary conservation planting.

To aid in providing for a single pass of equipment over the field as a part of planting, a trio of coulters is mounted in a predetermined triangular pattern on a tool bar in front of the planter with at least one fertilizer applicator trailing or to one side of either the second and third coulters such that a strip of soil having a width depending on the lateral spacing of the second and third coulters is tilled in the soil leaving otherwise undisturbed residue.

The lead coulter, placed laterally intermediate the second and third coulters, placed slightly deeper, provides a good seed slot and a place for roots to grow. Thus, the coulter assembly prepares a well aerated seedbed with one pass of the planter across a field containing residue of prior plantings.

Attachment of the assembly to an existing seed planting apparatus is accomplished by mounting brackets ensuring that two coulters will be longitudinally offset from each other for maximum efficiency, with the third positioned between the offset coulters. The mounting brackets allow coulter assembly attachment to the front, back, or underside of the front bar of an existing seed planting apparatus to provide a wide variety of placement options for the operator.

Preferably, one is attached in front of the bar, one behind the bar and the third between them. This provides a longitudinally offset arrangement for all of the coulters.

Alternatively, the three coulters may be mounted on a pair of longitudinally spaced front and rear bars of a planter but in the same relationship. Further, where very heavy residue exists, it has been found that an even more effective use of this coulter arrangement can be obtained with enhanced action of the lead coulter unit by inclining slightly the second and third coulters toward each other in the direction of travel; and where the mounting of three coulter units is difficult, utilizing only the second and third coulter units in the inclined, converging arrangement provides improved tillage. This arrangement, however, may be enhanced as to its capability of preparing the soft area along a path in front of the planter unit by the provision of an apparatus placed either fore or aft the coulters but in front of the planter unit for providing that the path be free of residue or trash.

SUMMARY OF THE PRESENT INVENTION

The present invention comprises a pair of toothed wheels rotatably operating in lateral opposition to one another and journalled for rotation each on an axis disposed obliquely to the path of travel of the apparatus. The wheels are mounted asymmetrically relative to each other, their teeth being curved downwardly and forwardly toward the path of movement to drive the wheels in rotation, thereby untangling and selectively clearing residue and other mulch from the path of trailing planter unit. The wheels are mounted for pivotal, vertical movement independent of the implement or planter while maintaining constant the oblique relationship. An alternative embodiment discloses a single-toothed wheel on either a right or left side of the apparatus fulfilling all other structural provisions of each of the pair of toothed wheels.

Accordingly, one object of the present invention is to provide a new and novel row cleaner which permits the farmer to sweep a path in front of a planter opener to prevent hairpinning which assures optimum seed-to-soil contact and functions to speed soil warmup.

Another object is to provide an improved row cleaner wherein either a single or a pair of toothed wheels may be utilized with a minimum of part changes.

Still another object of the present invention is the provision of concave wheels having gradually curved teeth for improved trash and other residue cleaning with a minimum of soil disturbance.

Yet another object of the present invention is the provision of one or a pair of trash clearing wheels each of which is journalled for rotation each on an axis disposed obliquely to the path of travel of the row cleaner.

Another object is the provision of permitting the obliquely disposed wheel or wheels to be vertically adjusted and to move vertically due to obstructions encountered during travel, such that the oblique disposition of the wheel or wheels remains constant during vertical movement.

A further object is the capability of quickly and easily raising the row cleaner apparatus from the ground to a transport position without changing the working position of the apparatus.

Other objects, advantages, and salient features of the present invention will become apparent from the following detailed description, which when taken in conjunction with the annexed drawings, discloses a preferred embodiment and process application of the present invention.

BRIEF DESCRIPTION OF THE DRAWINGS

These and other attributes of the invention will become more clear upon making a thorough review and study of the following description of a preferred embodiment, particularly when reviewed in conjunction with the drawings, wherein:

FIG. 5 is an exploded, perspective view of certain elements of the row cleaning apparatus of this invention, and showing alternate mounting arrangements in addition to alternate parts for the use of either a pair of row cleaning wheels together, or separately;

FIG. 6 is a reduced, plan view, partially and schematic, of the row cleaner apparatus of this invention assembled to a combined planter unit and coulter assembly;

FIG. 8 is a plan view showing schematically the row cleaning apparatus of this invention utilizing a pair of toothed wheels mounted in from of a trio of coulter wheels;

FIG. 9 is a side elevational view of the structure of FIG. 8 shown more in detail wherein the elements are associated with a till cart;

FIG. 10 is an enlarged side view, partly fragmentary, of one embodiment of the row cleaner apparatus of this position in a locked transport position;

FIG. 11 is a view similar to FIG. 10, showing the row cleaner apparatus of this invention in a soil surface working position;

FIG. 12 is a side elevational view similar to FIG. 11, and showing vertical linkage structure of the apparatus in a raised position;

FIG. 14 is an exploded perspective view of certain elements of the wheel/spindle/hub assembly of the apparatus.

BEST MODE FOR CARRYING OUT THE INVENTION

Figure 1:
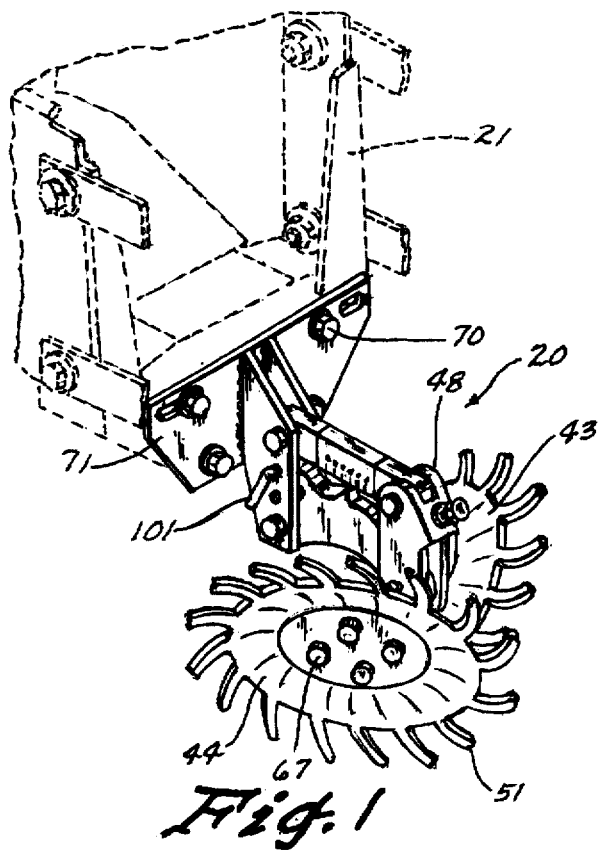
FIG. 1 is a perspective view of the row cleaner apparatus of this invention, showing the utilization of a pair of toothed wheels, and showing the apparatus in position for attachment to the front end of a planter apparatus as shown in phantom.

Referring now to the drawings in which the same reference numerals designate the same elements throughout the several views, FIG. 1 shows one form of the row cleaner apparatus of this invention generally indicated at (20) mounted on the front (21) of a coulter assembly (22) (FIG. 9) movably mounted on a cart (23) (FIG. 9), and which cart (23) is provided with rear wheels (26) having a swiveled mounting. Not shown is a liquid fertilizer tank for the application of fertilizer in association with preparation of the seedbed by the coulter assembly (22). The cart (23) can be hitched or mounted to a planter unit (27), such as that shown in FIG. 7, without modification and has a tongue unit (not shown) to the right of the cart (23) as shown in FIG. 9 for attachment to a tractor or other prime mover.

The coulter assembly (22) is shown mounted on a sub-frame (24), including a pair of drawbars (28) which sub-frame (24) is pivotally mounted by parallel bars (29) to the front of the can (23) and which sub-frame(24) is hydraulically raised and lowered by one or more cylinders (not shown) associated with the said sub-frame (24). The coulter assembly (22) and the can (23) are selected for illustration only and are, therefore, not illustrated in detail. A detailed description of the coulter assembly (22) is found in U.S. Ser. No. 08/343,806, filed Dec. 12, 1994, and is incorporated herein.

Generally, the coulter assembly (22) (FIGS. 8 and 9) includes a front coulter unit (32), a second coulter unit (33) mounted rearwardly and to one side of the front coulter unit (32), and a third coulter unit (34) mounted rearwardly of the second coulter unit (33) and to an opposite side of the front lead coulter unit (32). The coulter units (32), (33), and (34) are identical; and, in operation upon forward movement of the cart (23), the fluted blade (36) on the front coulter unit (32) penetrates the soil (37) allowing for easy downward growth and starts residue flowing away from the seed zone. The following mirrored fluted blades (38), (39) of the coulter units (33), (34) respectively, on each side of the row, roll back the soil in toward the center of the row. It will be appreciated that while FIGS. 8 and 9 illustrate only a single set of three, and in some instances only two coulter units (33)–(34), the sub-frame (24) assembly carries enough coulter assemblies (22) placed side-by-side to accommodate from four rows to twelve rows of seed paths.

For the farmer who does not want to incorporate the residue or trash into the seed path or row, one who wants to move it clear off to one side of the row, the use of the row cleaner apparatus (20) for each coulter assembly (22) (FIGS. 1, 8 and 9) is preferred. Generally, the apparatus (20) comprises a pair of toothed wheels (43), (44) (FIG. 1) rotatably operating in lateral opposition to one another, the wheels (43), (44) being journalled each in a hub assembly (46) (FIG. 14) mounted on a spindle unit (47) mounted in turn on a mounting unit (48) (FIG. 14) such that the rotational axis of each wheel (43), (44) is positioned in a predetermined oblique relationship (See FIG. 8) to the path of travel of the row cleaner apparatus (20).

Each wheel (43), (44); one wheel (43) a left-hand (L.H.) wheel as determined by standing behind the apparatus (20) and facing in the direction of forward travel, and the other wheel (44), a right-hand (R.H.) wheel, has a concave shape facing outwardly and downwardly of the path and is provided with a plurality of symmetrically arranged curved teeth (51) such that the wheels (43), (44) in the nature of those teeth (51), engaged by and with the residue upon movement of the apparatus (20) with the cart (23) are in contact with the soft (37). Forward motion of the cart (23), thus, drives the toothed wheels (43), (44) about their respective axes of rotation, the spindle units (47), the teeth (51) simultaneously pulling surface residue in laterally opposite directions laterally of the path of the advancing row cleaner apparatus (20).

More particularly, the hub assembly (46) (FIG. 14) comprises a circular hub (48) integral with a circular flange (52) having a plurality of openings (53) formed arcuately spaced therein, and with a pair of bearing cups (55) and bearing cones (57) for assembly within and on respective sides of the hub (49), and with a seal kit (58) on the side adjacent the spindle (59). A retaining ring (54) is inserted concentrically between the lower or outer face of the flange (52) and the upper or inner face of the wheel (44) to function as a seal. In addition, the spindle unit (47) includes, a jam nut (61) (FIG. 13) for the outer end (62) of the spindle (59) and a slotted nut (63) and corer pin (64) for the opposite end (66) of the spindle (59) within the flange (52). A quartet of fasteners (67) are provided for securing the respective toothed wheel (43) or (44) to the flange (52) such that the concavity of each wheel (43), (44) faces outwardly as best shown in FIG. 1.

Figure 7:
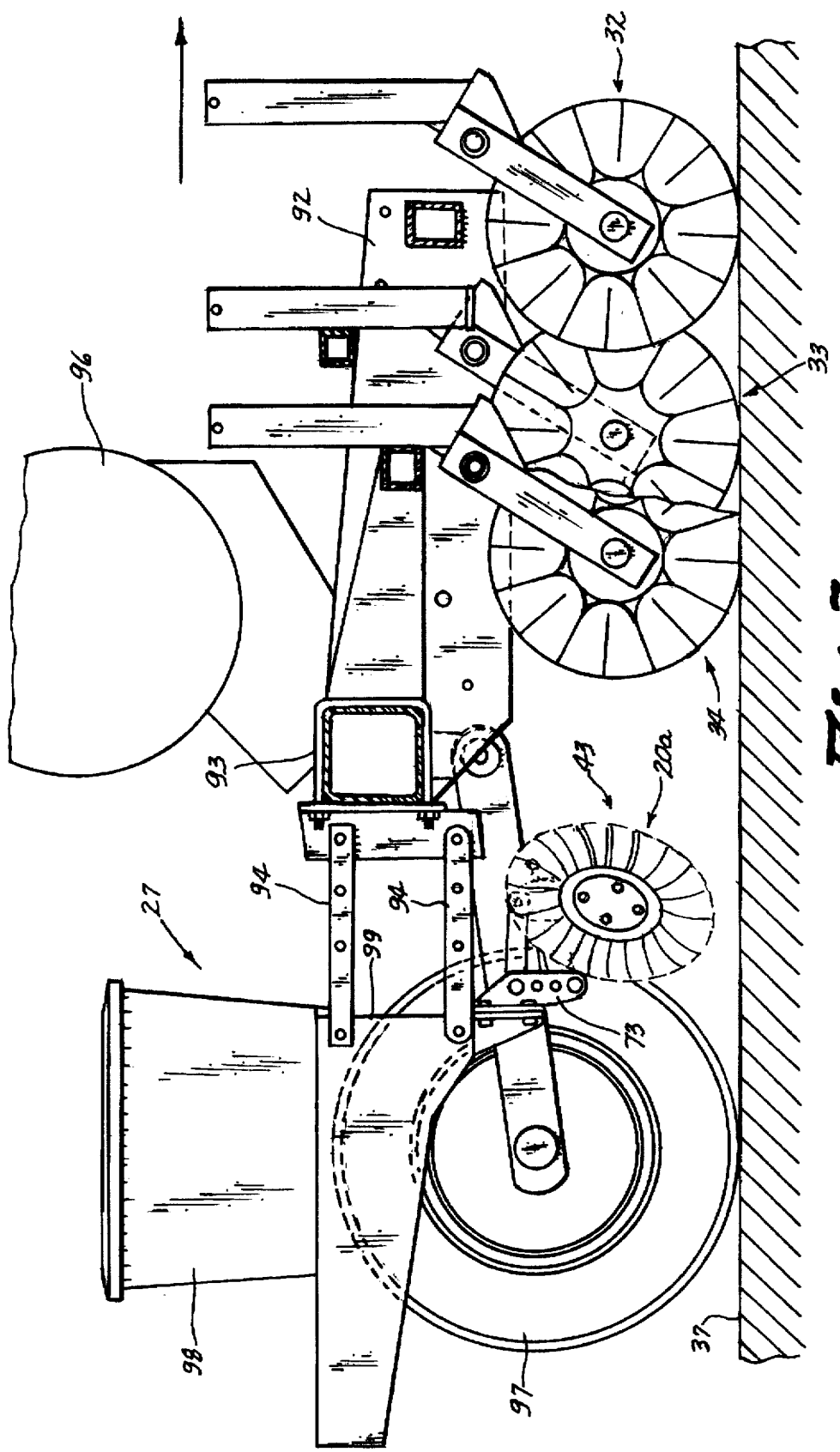
FIG. 7 is a side elevational view as taken along the line 7—7 in FIG. 6.

The mounting unit (48), as best shown on the left half of the FIG. 5 drawing, includes a mounting bracket (69) with a flat plate (71) accepted for mounting to the front (21) of a coulter assembly, or to a planter unit front (99) as shown in FIG. 7, by fasteners (70) and a pair of laterally spaced plates (72),(73) with a plurality of normally vertically spaced, laterally aligned openings (74) formed therein for receiving a pair of pivot pins (76). The mounting unit (48) includes further an upper link (77) and a lower link (78) adapted for parallel pivoted mounting within a vertical plane as best shown in FIGS. 5 and 6, and see FIGS. 10–12; and includes still further a double row cleaner mounting arm (79), also having a pair of normally vertically spaced openings (81) formed therein, and sized to receive pivot pins (82). The pivotal assembly of the links (77) and (78) between the plates (72), (73) and within a space (not shown) formed within the mounting arm (79), utilizing the pivot pins (76) and (82) is best shown in FIGS. 10–12.

It will be noted that the lower link (78) of the parallel links (77), (78) has a lug (83) formed on its upper edge adjacent the lower edge of the upper link (77). Also, the working depth of the toothed wheels (43), (44) is adjustable by the provision of another adjustment lug (84) also formed on the lower link (78) upper edge, useable in conjunction with a capscrew (86) and lock nut (85) (FIG. 5) inserted through an opening provided in the mounting arm (79) such that the capscrew (86) may be engageable with the lower link lug (84). This provides for adjusting and holding the working depth position of the cleaner wheels (43), (44) relative to the planter unit, (27) for example.

At the base, on opposite sides thereof, each disposed asymmetrically to each other and at an angle oblique to the centerline of the row cleaner apparatus (20) as it travels forwardly (FIG. 8), are a pair of circular cups (87), (88) each adapted to receive a spindle (59) and the hub (49) with associated spindle unit (47) elements (FIG. 14). Thus, each hub flange (52) for each cup (87), (88), is placed at a like oblique angle. The left-hand wheel (43) (FIG. 3) is secured to the hub flange (52) on the left side of the arm (79) by fasteners (67) (FIGS. 2, 14), and the right-hand wheel (44) (FIG. 4) is secured by like fasteners (67) to the opposed hub flange (52) on the right-hand side of the mounting arm (79).

Figure 2:
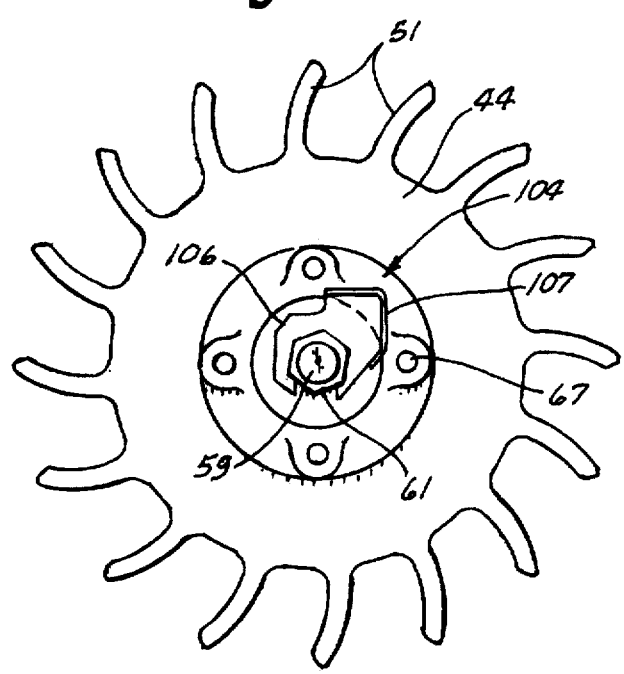
FIG. 2 is side elevational view from the inside of one wheel of the row cleaner apparatus.
Figures 3, 4:
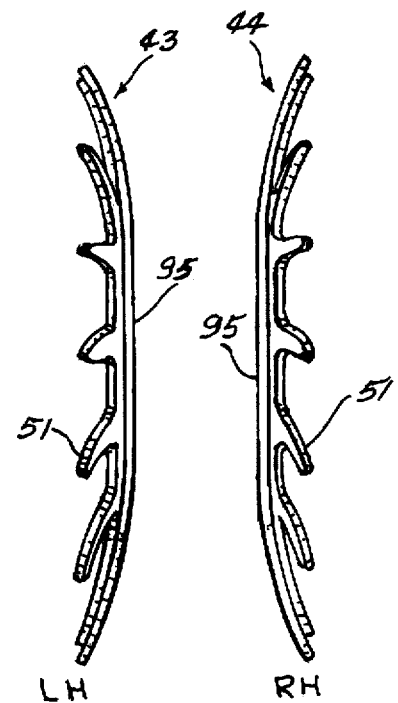
FIG. 3 is an end elevational view of a left-hand row cleaning wheel.
FIG. 4 is an end elevational view of the right-hand row cleaning wheel of FIG. 2.

Referring to FIGS. 2–4, each wheel (43), (44) has a concave shape in end or side elevation, has an outer diameter of approximately 15 inches with 16 equally spaced teeth (51) each of at least one (1) inch depth. The teeth (51) are curved at an approximate 3½ inch radius on each aggressive or soil entering side (50), such that upon mounting, in operation the teeth (51) curve downwardly and forwardly in the direction of travel of the row cleaner (20). Thus, as each wheel (43), (44) is rotated in a clockwise direction as shown in FIGS. 1 and 11, the curvature of the teeth tends to pull the teeth (51) away from the residual mulch and/other trash, thus effecting a self-cleaning action. Each wheel (43), (44) is provided with a flat face (95) for mounting to a comparable flat facing surface of the respective hub flange (52) (FIG. 13) the ring (54) (FIG. 14)being concentrically inserted therebetween.

It has been found also that where the farmer uses two coulter units (33), (34), for example, in a mirrored relationship as shown, the dual cleaner action of a pair of wheels (43), (44) (FIG. 1) is preferred; however, where trio of coulter units (32), (33), and (34) are used as shown in FIGS. 6 and 7, only a single wheel (43) or (44) is necessary to clear the remaining residual mulch. Thus, referring to the right half of FIG. 5, an alternate mounting unit (48a) is provided the dual mounting arm (79) shown modified to either a left-hand mounting arm (90) with a cup (88) adapted to mount the hub assembly (46), spindle unit (47) and the left-hand wheel (43), or a right-hand mounting arm (91) with cup (87) adapted to mount the same unit with the right hand wheel (44). Further, however, the dual mounting arm (79) could be used with the mounting thereon of only one wheel (43) or (44). The alternate unit (48a), also has an alternate mounting bracket (69a) for a different attachment to a planter unit, for example.

The single wheel row cleaner apparatus, indicated generally at (20a) in FIGS. 6 and 7, is again mounted behind a coulter assembly (22) and in front of the planter unit (27). This arrangement is selected for illustrative purposes only and this is not illustrated in detail. Generally, a coulter frame (92) is provided for mounting the coulter assembly (22), described hereinbefore, on a tool bar (93), with the conventional planter unit (27) connected to the frame (92) by a pair of parallel arms (94). The coulter frame (92) carries a holding tank (96) with appropriate mechanism (not shown) for metering fertilizer to the coulter assembly (22). The planter unit (27) includes a pair of gauge wheels (97), only one shown, pivotally mounted on the coulter flame (92) and controlled by hydraulic mechanism (not shown) from the planter unit (27) to adjust the working height of the coulter assembly (22). If desired, the dual cleaner apparatus (20) may be mounted to the front (99) of the planter unit (27) rather than the alternate apparatus (20a) with either a single left-hand or right-hand wheel (43) or (44), respectively.

In operation, it will be appreciated that the cart (23) of FIG. 9, or the planter unit (27) of FIG. 7 places the row cleaning apparatus (20) or (20a) along an imaginary centerline of the respective described implements of FIGS. 7 and 9 such that as those implements move forwardly, the teeth (51) of either or both wheels (43), (44) are set at a depth such that the wheels (43) and/or (44) turn smoothly without plugging or gouging by the apparatus (20) or (20a) in the ground.

As a consequence of the oblique attitudes at which the which the wheels (43), (44) are mounted relative to the centerline, the surface residue is deflected either in laterally opposite directions laterally of the path of the advancing row cleaner apparatus (20), or it is pulled or deflected laterally away to one side or the other of the path of the advancing apparatus (20a). The provision of the parallel link structure (77), (78) provides for the weight of the wheels (43), (44) and associated pans to give sufficient down pressure on the wheels (43) and/or (44) for proper operation, thereby alleviating the need of coil or like springs as a part of the apparatus. Referring to FIGS. 11 and 12, working positions of the apparatus (20a), for example are shown, the positions for apparatus (20) being the same; and to lock either apparatus (20) or (20a) in a raised position as best illustrated in FIG. 10, a locking pin (101) (FIG. 5) is provided, which pin (101) is inserted through aligned openings (74a) of the mounting arm (69a) otherwise and a hole (102) (FIG. 5) formed in the lower link (78), thus locking the wheels (43) and/or (44) in a raised position. Otherwise, the pin (101) is inserted only through aligned openings (74b) (FIG. 11) of the mounting arm (69a) thus allowing free movement of the links (77), (78). A klik pin (103) (FIG. 5) is provided to keep the locking pin (101) in place.

The arrangement of the parallel links (77), (78) also allows for vertical working movement of the wheels (43)

and/or (44) independently of any planter unit associated therewith; and further, as they are disposed within an imaginary vertical plane passing longitudinally of the apparatus (20) or (20a) and along an imaginary centerline of the path of travel of the same apparatus, their pivotal vertical movement does not affect the oblique position of the wheels (43) and/or (44) to the soil surface (37) and to the path of apparatus travel. Importantly, therefore, that oblique relationship remains constant at all times, regardless of the position of the wheels (43) and/or (44) above the soil, when in use.

Figure 13:
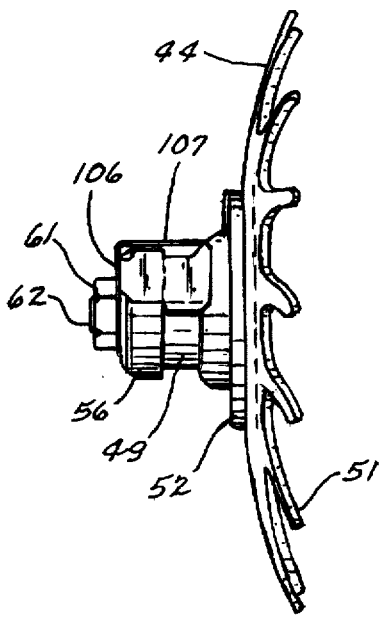
FIG. 13 is a side elevational view of the wheel of FIG. 2.

As beg shown in FIGS. 2 and 13, a stripper element (104) is illustrated, which includes an L-shaped member having one side (106) sized to fit about the spindle (59) (FIG. 2) and be held in place by the jam nut (61) with the other side (107) extended partially over and about the hub (51). This aids in preventing a wrapping of the residue about the hub (51) during operation.

Although preferred forms of the invention have been described herein, such should not be utilized in a limiting sense in interpreting the scope of the present invention. Obvious modifications to the exemplary embodiments herein could be readily made by those skilled in the art without departing from the spirit of the present invention.

I claim:

1. A row cleaner apparatus for attachment to a planter unit comprising:

a mounting bracket for connection to the planter unit;

a mounting arm;

a pair of parallel links having opposed sets of ends, one set of ends pivotally connected to said mounting bracket and an opposite set of ends pivotally connected to said mounting arm;

at least one toothed wheel rotatably mounted on said mounting arm and extended therefrom in an oblique relationship to the path of travel of the planter unit; and first means for locking said links to said mounting bracket in alternate locked and unlocked positions relative to said mounting bracket whereby said links are prevented from pivotal movement in said locked position, and are free to pivot in said unlocked position;

and further wherein said first means includes a plurality of separate openings formed in said mounting bracket, a passage formed in one of said links one end, said passage alignable with one of said openings, and a fastener for insertion through an aligned pair of opening and passage for locking said one link against movement, said fastener insertable through an unaligned opening whereby said links are free to pivotally move.

2. The row cleaner apparatus of claim 1, and further including a second means for limiting the pivotal movement of said links about said mounting bracket.

3. The row cleaner apparatus of claim 2, and further wherein said second means includes a lug formed on one of said links, and a threaded member threadably mounted on said mounting arm for variable movement toward and away from said lug, said member having one end engageable with said lug thereby variably limiting movement of said one link in one pivotal direction relative to said mounting bracket.

4. The row cleaner apparatus of claim 1, and further including a second means for limiting the pivotal movement of said links about said mounting bracket.

5. The row cleaner apparatus of claim 4, and further wherein said second means includes a lug formed on one of said links, and a threaded member threadably mounted on said mounting arm for variable movement toward and away from said lug, said member having one end engageable with said lug thereby variably limiting movement of said one link in one pivotal direction relative to said mounting bracket.

* * * * *